United States Patent
Fujita

(10) Patent No.: US 7,088,691 B2
(45) Date of Patent: Aug. 8, 2006

(54) COMMUNICATIONS EQUIPMENT THAT CARRIES OUT COMMUNICATION WITHIN NETWORK HAVING PLURAL PIECES OF COMMUNICATIONS EQUIPMENT

(75) Inventor: Shigeru Fujita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 858 days.

(21) Appl. No.: 09/923,423

(22) Filed: Aug. 8, 2001

(65) Prior Publication Data

US 2002/0026492 A1 Feb. 28, 2002

(30) Foreign Application Priority Data

Aug. 22, 2000 (JP) ............... 2000-251213

(51) Int. Cl.
*H04Q 7/20* (2006.01)

(52) U.S. Cl. .................... 370/311; 455/343.2

(58) Field of Classification Search ............. 370/311; 455/343.2, 522
See application file for complete search history.

(56) References Cited

U.S. PATENT DOCUMENTS

| 5,347,545 | A | 9/1994 | Ishii et al. ............... 375/37 |
| 5,870,391 | A | 2/1999 | Nago ..................... 370/330 |
| 5,907,545 | A | 5/1999 | Arai et al. ............... 370/342 |
| 6,078,609 | A | 6/2000 | Nago ..................... 375/202 |
| 6,192,230 | B1 * | 2/2001 | van Bokhorst et al. .. 455/343.3 |
| 6,571,103 | B1 * | 5/2003 | Novakov ................. 455/464 |

FOREIGN PATENT DOCUMENTS

| JP | 5-3477 | 1/1993 |
| JP | 7-183901 | 7/1995 |
| JP | 2000-196694 | 7/2000 |

* cited by examiner

*Primary Examiner*—Min Jung
(74) *Attorney, Agent, or Firm*—Fitzpatrick, Cella, Harper & Scinto

(57) ABSTRACT

When data transmission is to be conducted between a master station and a slave station, the master station moves the other slave stations to such a park mode (standby state) that they do not make a communication request. Thus the master station and the slave station can conduct data transmission from and to each other with priority use of a communication network. After completion of the data transmission process, the master station sends each slave station a notification of release of the communication network to return each slave station to the normal operating state.

11 Claims, 3 Drawing Sheets

COMMUNICATIONS EQUIPMENT THAT CARRIES OUT COMMUNICATION WITHIN NETWORK HAVING PLURAL PIECES OF COMMUNICATIONS EQUIPMENT

BACKGROUND OF THE INVENTION

1. Field of the Invention

The present invention relates to communications equipment that carries out communication within a network having plural pieces of communications equipment.

2. Related Background Art

A conventional network formed with plural pieces of communications equipment, especially a network based on the Bluetooth standard employing a frequency hopping wireless communications system forms a piconet from one master station and one to seven slave stations on a network basis. This type of network provides communications using a polling system. The polling system is such that the master station or one of the slave stations can exclusively use the network for a fixed period of time called a slot. In other words, the master station selects a slave station as its communication partner in a slot, and the selected slave station sends a response back in the next slot.

The above-mentioned conventional communication system, that is, the polling communication system, however, requires the master station to carry out polling communications with all the slave stations. As the number of slave stations in the network increases, the allocation of slot dedicated to each slave station is reduced, compared to a case where the slave stations are few in number, which reduces the communication capacity and hence the effective transmission speed of each slave station.

Further, in such a wireless communication network, since many pieces of communications equipment, especially of portable information equipment, are battery-operated, the reduction in effective transmission speed results in a falling ratio of effective communications to equipment operating time.

SUMMARY OF THE INVENTION

It is an object of the present invention to prevent a falling ratio of effective communications to operating time of communications equipment within a network.

It is another object of the present invention to place high priority to a piece of equipment that is making a communication request.

It is still another object of the present invention to realize low power consumption of communications equipment.

Other objects of the present invention will become apparent from the following specification and accompanying drawings.

DESCRIPTION OF THE PREFERRED EMBODIMENTS

Embodiments of the present invention will now be described in detail with reference to the accompanying drawings.

First Embodiment

Figure 1:
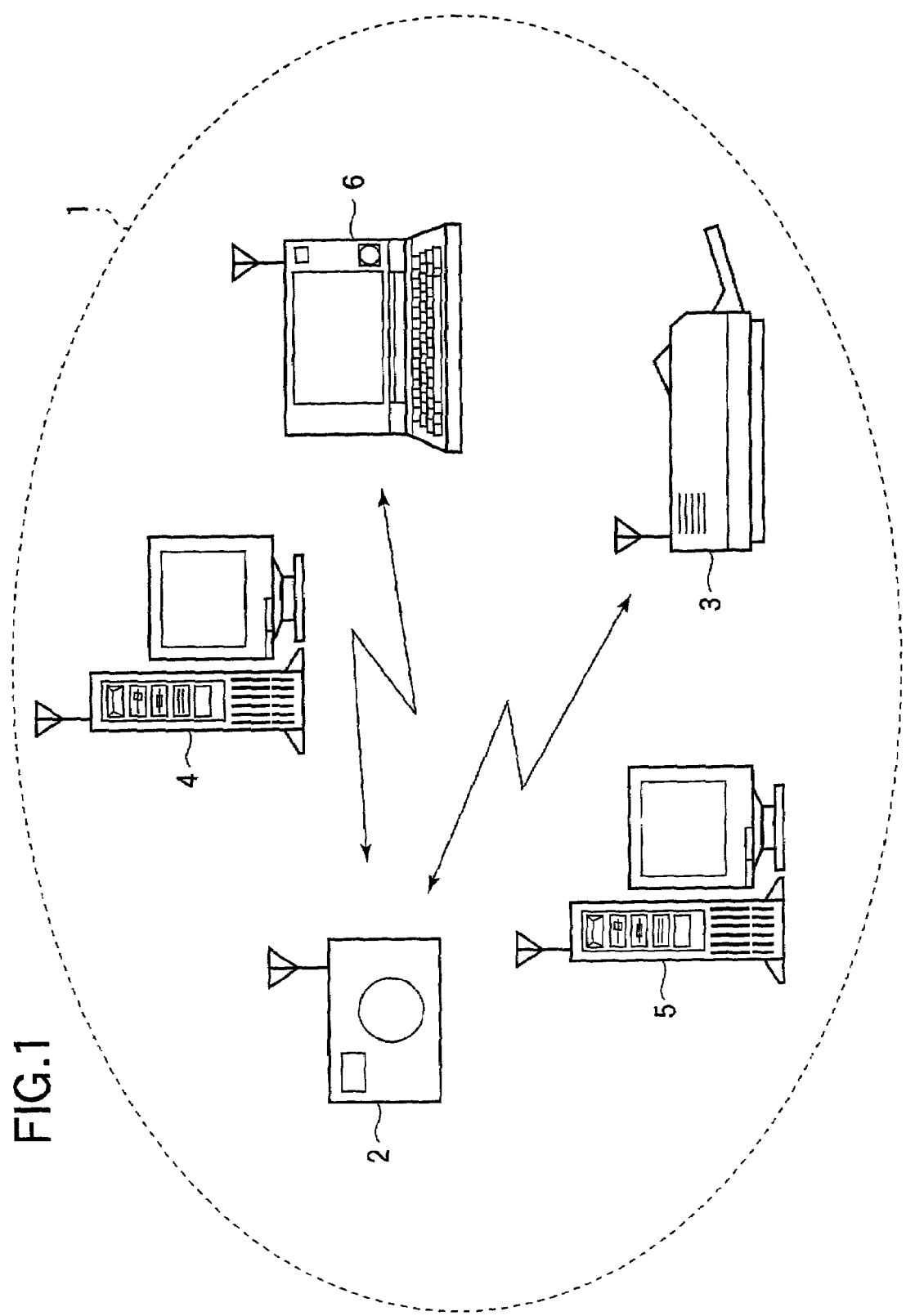
FIG. 1 is an overview of a wireless communication network 1 having communications equipment according to an embodiment of the present invention.

FIG. 1 is an overview of a wireless communication network having communications equipment according to an embodiment of the present invention.

In FIG. 1, a wireless communication network (radio LAN) 1 is formed with plural pieces of communications equipment having communications capabilities. The wireless communication network 1 provides Bluetooth-compliant wireless communications between pieces of communications equipment to form a piconet based on the Bluetooth standard. In general, the piconet is such that a piece of communications equipment becomes a master station, and one to seven pieces of communications equipment as slave stations intercommunicate with the master station. According to the network reference model, communication is made possible only between the master station and a slave station at the level of the physical layer, that is, slave stations cannot directly communicate with each other. In this case, the piconet includes the following pieces of communications equipment having radio communications capabilities: a digital camera 2, a network-ready printer 3, computers 4 and 5, and portable information equipment (PDA: Personal Digital Assistant) 6.

Description will be made next about an operation process of a master station at data transmission executed in the wireless communication network 1 of FIG. 1. The following describes a case where the master station in the above-mentioned piconet is the digital camera 2, and the slave stations are the printer 3, the computers 4, 5, and the PDA 6.

Figure 2:
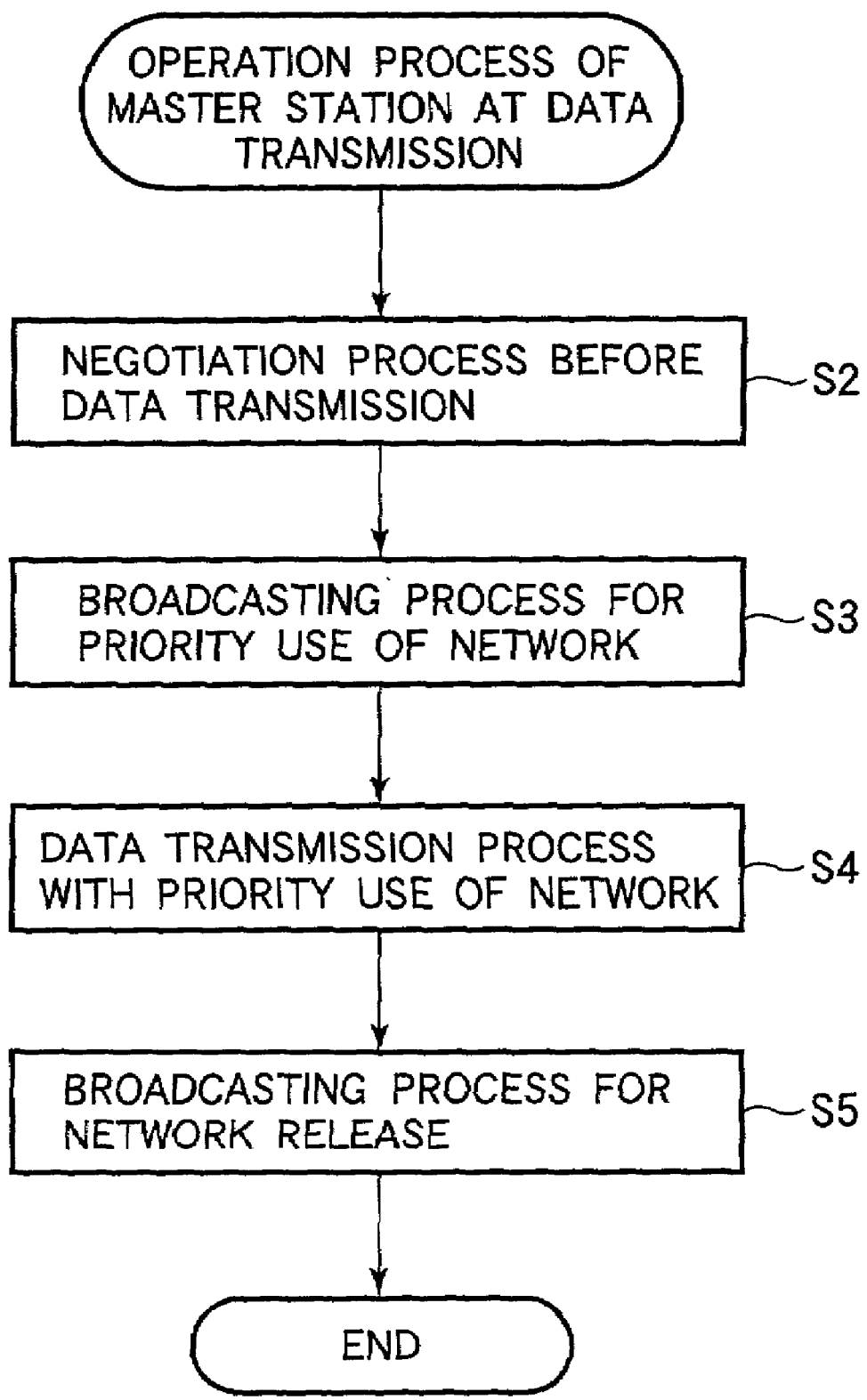
FIG. 2 is a flowchart showing an operation process of a master station at data transmission executed in the wireless communication network 1 according to embodiments of the present invention.

FIG. 2 is a flowchart showing the operation process of the master station at data transmission executed in the wireless communication network of FIG. 1.

In FIG. 2, it is assumed that an operator of the digital camera 2 operates an operation part on the digital camera 2 to instruct the digital camera 2 to perform printing on the printer 3 as one of the slave stations. Upon receipt of the instruction, the digital camera 2 has a negotiation process before data transmission with the printer 3 that is one of the slave stations (step S2). In this process, the digital camera 2 refers to the printer 3 for the presence of printing paper, the residual quantity of ink, operating status of another printing job and so on, to judge whether there is any problem. If there is no problem, the digital camera 2 notifies the printer 3 that the digital camera 2 starts sending printing data to the printer 3. This process allows the printer 3 not to move to a standby state (park mode) as specified in the Bluetooth scheme even upon receiving a broadcasting request from the digital camera 2 in the next step 3.

Next, the digital camera 2 performs a broadcasting process for priority use of the network for all the slave stations within the wireless communication network 1. In this process, the digital camera 2 informs the printer 3, the computers 4, 5 and the PDA 6 that the wireless communication network 1 is just going to be used for communication between the digital camera 2 and the printer 3 with high priority (step 3). To be more specific, the digital camera 2 sends each slave station a broadcasting message of transition to the park mode (notification of priority use of the network).

Upon receipt of the broadcasting message, each slave station is moved to the park mode in which the slave station does not make a request for communication, thus limiting each slave station's use of the wireless communication network 1. In this case, however, the digital camera 2 has already had the negotiation process with the printer 3 in the above-mentioned step 2. Therefore, the printer 3 to receive printing data from the digital camera 2 does not move to the park mode even upon receiving the broadcasting message of transition to the park mode.

Next, the digital camera 2 performs a data transmission process to send printing data to the printer 3 with priority use of the wireless communication network 1 (step 4). After completion of the data transmission process, the digital camera 2 as the master station performs a broadcasting process to inform each slave station of release of the wireless communication network 1 (step S5), and it ends the operation process. To be more specific, the digital camera 2 sends each slave station a broadcasting message of a request for return to a normal mode (notification of network release) to return each slave station from the park mode to the normal operating state.

Figure 3:
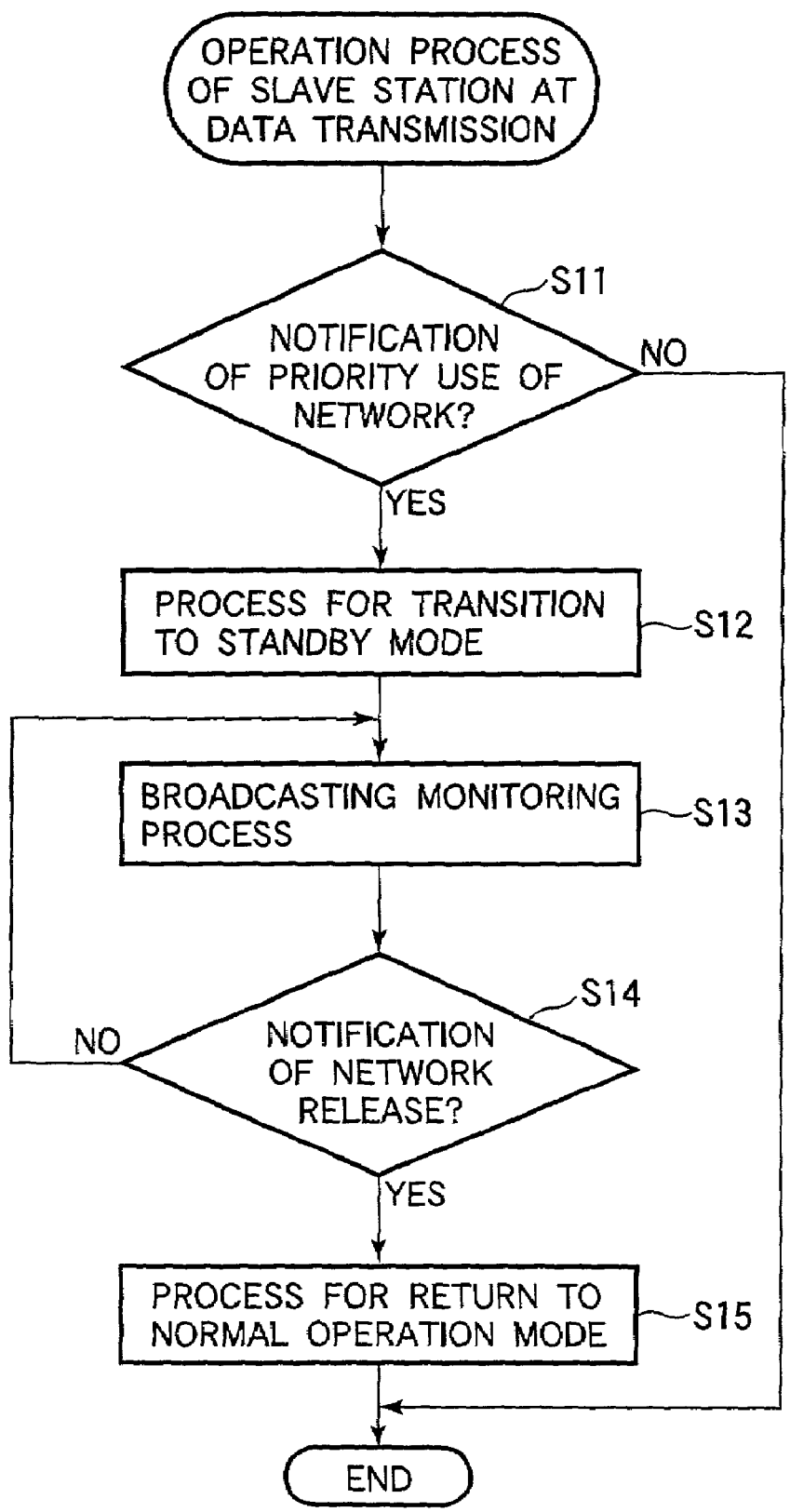
FIG. 3 is a flowchart showing an operation process of a slave station executed in the wireless communication network 1 according to the embodiments of the present invention.

FIG. 3 is a flowchart showing an operation process of each slave station at data transmission executed in the wireless communication network 1 of FIG. 1.

In FIG. 3, when the operation process is started, each slave station judges whether the received message is the notification of priority use of the network (step S11). As a result of judgement, if the received message is not the notification of priority use of the network, the operation process is ended. Even when the received message is the notification of priority use of the network, if no negotiation process before data transmission has not been conducted before the notification is received, each slave station performs a process for transition to the park mode (step S12). To be more specific, each slave station moves to the park mode (standby state) in which the slave station itself becomes a low power consumption state without making a communication request to the wireless communication network 1. In other words, each slave station changes its operating state to the park mode in response to the request for transition to the park mode from the master station as specified in the Bluetooth scheme.

It should be noted that the slave station (the printer 3 in the embodiment) that have had the negotiation process before data transmission with the digital camera 2 as the master station does not move to the park mode even upon receiving the notification of priority use of the network.

Next, each slave station performs in the park mode a broadcasting monitoring process for the wireless communication network 1 (step S13). In the park mode as specified in the Bluetooth scheme, since each slave station is synchronized with the wireless communication network 1, it receives a message notified (broadcast) at each park interval. Then, each slave station judges whether the received message is the notification of network release (step S14). As a result of judgement, if the received message is not the notification of network release, each slave station returns to step S13 from which it repeats the operation process again. On the other hand, if the received message is the notification of network release, each slave station performs a process for return to the normal operation mode (step S15), and then it ends the operation process. After completion of this process, each slave station enters such a state that it can communicate with the master station.

It should be noted that the first embodiment described such a case where the digital camera 2 is the master station in the piconet, but the printer 3 may be the master station. Further, the communications equipment is not limited to the above-mentioned equipment. For example, the communications equipment may be a portable telephone, a headset, a laptop computer, a facsimile and so on, as long as they have radio communications capabilities.

According to the above-mentioned first embodiment, it is assumed that printing data is to be transmitted from the digital camera 2 as the master station to the printer 3 as one of the slave stations. In this case, the digital camera 2 moves all the slave stations but the printer 3 to the park mode (standby state) in which they do not make a request for communication through the wireless communication network 1 (step S12 in FIG. 3). After completion of data transmission to the printer 3 with priority use of the wireless communication network 1, the digital camera 2 notifies each slave station of release of the wireless communication network 1 to return each slave station to the normal operating state (step S15 in FIG. 3). Thus the digital camera 2 as the master station and the printer 3 as one of the slave stations exclusively use the network during data transmission, which improves data transmission efficiency, and hence reduces data transmission time, compared to the conventional technique. Further, in the park mode (standby state) based on the Bluetooth scheme, each slave station is synchronized with the wireless communication network 1 to check a broadcasting packet such as a beacon transmitted from the master station at each park interval. After receiving the broadcasting packet, each slave station in the park mode, has only to perform synchronization compensation. This makes it possible to reduce power consumption of each slave station for radio communication processing, and hence the total power consumption of the wireless communication network 1 in which plural slave stations are in the park mode.

It should be noted that the first embodiment described the park mode as a standby state in the Bluetooth scheme, but the present invention may also use one of the other standby states in the Bluetooth scheme, namely a sniff or hold mode, instead of the park mode. Since any of the standby states, the sniff, park or hold mode, is the mode of low power consumption in the Bluetooth system, any mode can reduce power consumption of each slave station for radio communication as mentioned above.

Second Embodiment

The second embodiment is different from the first embodiment in that the transmission of data is performed between the digital camera 2 and the printer 3 both as slave stations through the PDA 6 as the master station. It should be noted that the second embodiment has the same structure as the first embodiment except that the master station is the PDA 6, and therefore, description thereof will be omitted.

It is assumed in FIG. 2 that the digital camera 2 as one of the slave stations makes a request to the PDA 6 as the master station for priority use of the network together with the printer 3 as another slave station for data transmission. Upon receipt of the request, the PDA 6 has the negotiation process before data transmission with the digital camera 2 and the printer 3 (step S2). Then the PDA 6 performs the broadcasting process for priority use of the network to inform each slave station within the wireless communication network 1 of priority use of the wireless communication network 1 (step S3). This process makes each slave station move to the park mode (standby state) in which the slave station does not make a request for communication, thus limiting each slave station's use of the wireless communication network 1. In this case, however, the digital camera 2 and the printer 3 to which printing data are transmitted from the digital camera 2 do not move to the park mode even upon receiving the request for transition to the park mode from the PDA 6 as the master station. In other words, only pieces of the communications equipment other than the PDA 6, the digital camera 2 and the printer 3, namely the PC 4 and 5 as the other slave stations within the wireless communication network 1, move to the park mode during the transmission of printing data.

Next, the digital camera 2 transmits printing data to the printer 3 through the PDA 6 with priority use of the wireless communication network 1 (step S4). After completion of the data transmission process, the PDA 6 as the master station performs the broadcasting process to inform each slave station of release of the wireless communication network 1 (step S5), and it ends the operation process. To be more specific, the PDA 6 sends each slave station the broadcasting message of the request for return to the normal mode (notification of network release) to return each slave station from the park mode to the normal operating state.

In the second embodiment, operations of the other slave stations when notified that the digital camera 2 and the printer 3 both as slave stations use the wireless communication network 1 with high priority, and that the wireless communication network 1 is released are the same as those in the first embodiment. It should be noted that the communications equipment is not limited to the above-mentioned equipment, and a portable telephone, a headset, a laptop computer, a facsimile and so on may also be used as long as they have radio communications capabilities.

In the second embodiment, when slave stations pair up for data transmission, the data transmission process is performed through another piece of communications equipment as the master station. Therefore, pieces of communications equipment operating during the transmission of data are three in number, that is, the master station and two slave stations. Since the number of operating stations increases, the total power consumption of the wireless communication network 1 increases compared to that in the first embodiment. However, the first embodiment needs a process for changing the master station in the wireless communication network 1, that is, in the piconet, in order to set one equipment as the slave station and the other as the master station. In contrast, the second embodiment does not need such a process to change the master station, which reduces time to be spent on this process.

According to the above-mentioned second embodiment, it is assumed that printing data is transmitted from the digital camera 2 to the printer 3 both as slave stations through the PDA 6 as the master station. In this case, the PDA 6 moves all the slave stations but the digital camera 2 and printer 3 to the park mode (standby state) in which they do not make a request for communication through the wireless communication network 1 (step S12 in FIG. 3). After completion of data transmission from the digital camera 2 to the printer 3 with priority use of the wireless communication network 1 (step S4 in FIG. 2), the PDA 6 notifies each slave station of release of the wireless communication network 1 to return each slave station to the normal operating state (step S15 in FIG. 3). This makes it possible to improve data transmission efficiency, and hence reduces data transmission time, compared to the conventional technique.

It should be noted that, like the first embodiment, the second embodiment described the park mode as a standby state in the Bluetooth scheme, but the present invention may also use one of the other standby states in the Bluetooth scheme, the sniff or hold mode, instead of the park mode.

As described above, the present invention can prevent reduction in efficiency of use of a communication line in a network, and hence reduce communication time.

Further, the communications equipment that is to carry out communication can keep its normal operating state even upon receiving the notification of priority use of the network, which makes it possible to give the equipment preference on use of the communication line in the network.

The other pieces of communications equipment that have not had the predetermined negotiation process with the master station move to such an operating state that they do not make a communication request upon receiving the notification of priority use of the network. On the other hand, they return to the normal operating state upon receiving the notification of network release. Therefore, the communications equipment, especially in the event of battery-operated portable information equipment, can carry out long-time communication without reducing the efficiency of effective communications to the operating time.

Further, the communications equipment moves to such a state that it does not make a communication request, which makes it possible to reduce the total power consumption of the network.

What is claimed is:

1. A communication apparatus comprising:
   a negotiation unit configured to, wherein a low power consumption mode transit request is a request for a device to transit from a present mode to a low power consumption mode and prohibit any transmission until the low power consumption mode is released, execute a predetermined negotiation with a first device in order to prevent transiting from a present mode to a low power consumption mode and prevent prohibiting any transmission even though the first device receives the low power consumption mode transit request; and
   a first transmitting unit configured to broadcast the low power consumption mode transit request to a plurality of devices including the first device after said negotiation unit executes the predetermined negotiation with the device.

2. A communication apparatus according to claim 1, wherein the communication is executed using a Bluetooth system.

3. A communication apparatus according to claim 2, wherein the low power consumption mode is used for a low power consumption in a Bluetooth system.

4. A communication apparatus according to claim 1, comprising a second transmitting unit configured to transmit a signal to release both the low power consumption mode and a transmission prohibition after said communication apparatus communicates with the first device.

5. A communication apparatus comprising:
   a negotiation unit configured to, wherein a low power consumption mode transit request is a request for a device to transit from a present mode to a low power consumption mode and prohibit any transmission until the low power consumption mode is released, execute a predetermined negotiation with a first device in order to prevent transiting from a present mode to a low power consumption mode and prevent prohibiting any transmission even though the first device receives the low power consumption mode transit request;
   a transmitting unit to transmit the low power consumption mode transit request to a plurality of devices including the first device after said negotiation unit executes the predetermined negotiation with the device; and a communicating unit configured to communicate with the first device, after (a) said transmitting unit transmits the low power consumption mode transit request, (b) a mode of another device is transited from a present mode to the low power consumption mode, and (c) any transmission by the another device is prohibited.

6. A communication apparatus for executing a communication with a device, wherein the device executes a predetermined negotiation with said communication apparatus before data transmission, said communication apparatus comprising:

a receiving unit configured to receive a low power consumption mode transit request to transit from a present mode to a low power consumption mode and prohibit any transmission; and a control unit that is, in the case that said receiving unit receives a low power consumption mode transit request to transit from a present mode to a low power consumption mode, configured to transit said communication apparatus from a present mode to a low consumption power mode and control said communication apparatus to prohibit any transmission according to presence or absence of execution of the predetermined negotiation with the device.

7. A communication apparatus according to claim 6, wherein, in the case that said receiving unit receives a signal to release a low power consumption mode, said control unit executes a control to release both a low power consumption mode and a transmission prohibition.

8. A communication method comprising:

a negotiation step of, wherein a low power consumption mode transit request is a request for a device to transit from a present mode to a low power consumption mode and prohibit any transmission until the low power consumption mode is released, executing a predetermined negotiation with a first device in order to prevent transiting from a present mode to a low power consumption mode and prevent prohibiting any transmission even though the first device receives the low power consumption mode transit request; and a first transmission step, of broadcasting the low power consumption mode transit request to a plurality of devices including the first device after said negotiation step executes the predetermined negotiation with the device.

9. A communication method according to claim 8, comprising a second transmission step, of transmitting a signal to release both the low power consumption mode and a transmission prohibition after the communication apparatus communicates with the first device.

10. A communication method comprising:

a negotiation step of, wherein a low power consumption mode transit request is a request for a device to transit from a present mode to a low power consumption mode and prohibit any transmission until the low power consumption mode is released, executing a predetermined negotiation with a first device in order to prevent transiting from a present mode to a low power consumption mode even though the first device receives the low power consumption mode transit request;

a transmission step of transmitting the low power consumption mode transit request to a plurality of devices including the first device after said negotiation step executes the predetermined negotiation with the device; and a communication step of communicating with the first device, after (a) transmitting the low power consumption mode transmit request in said transmission step, (b) transiting another communication device from a present mode to the low power consumption mode, and (c) any transmission by the another communication device is prohibited.

11. A communication method of executing a communication with a device, comprising:

a negotiation step of the device executing a predetermined negotiation with a communication apparatus before data transmission;

a receiving step of receiving by the communication apparatus of a low power consumption mode transit request to transit from a present mode to a low power consumption mode and prohibit any transmission, a control step effected by the communication apparatus of, in the case that a low power consumption mode transit request to transit from a present mode to a low power consumption mode is received in said step of receiving the low power consumption mode transit request, transiting the communication apparatus from a present mode to a low power consumption mode and controlling the communication apparatus to prohibit any transmission according to presence or absence of execution of the predetermined negotiation in said negotiation step.

* * * * *

UNITED STATES PATENT AND TRADEMARK OFFICE
CERTIFICATE OF CORRECTION

PATENT NO. : 7,088,691 B2  
APPLICATION NO. : 09/923423  
DATED : August 8, 2006  
INVENTOR(S) : Shigeru Fujita Page 1 of 1

It is certified that error appears in the above-identified patent and that said Letters Patent is hereby corrected as shown below:

COLUMN 8
Line 22, "transmit" should read --transit--.
Line 35, "transmission," should read --transmission; and--.

Signed and Sealed this

Twenty-second Day of January, 2008

JON W. DUDAS
*Director of the United States Patent and Trademark Office*